Sept. 21, 1937.   R. H. WHITEHEAD   2,093,532
SMALL SELF STARTING SYNCHRONOUS MOTOR
Filed April 6, 1936
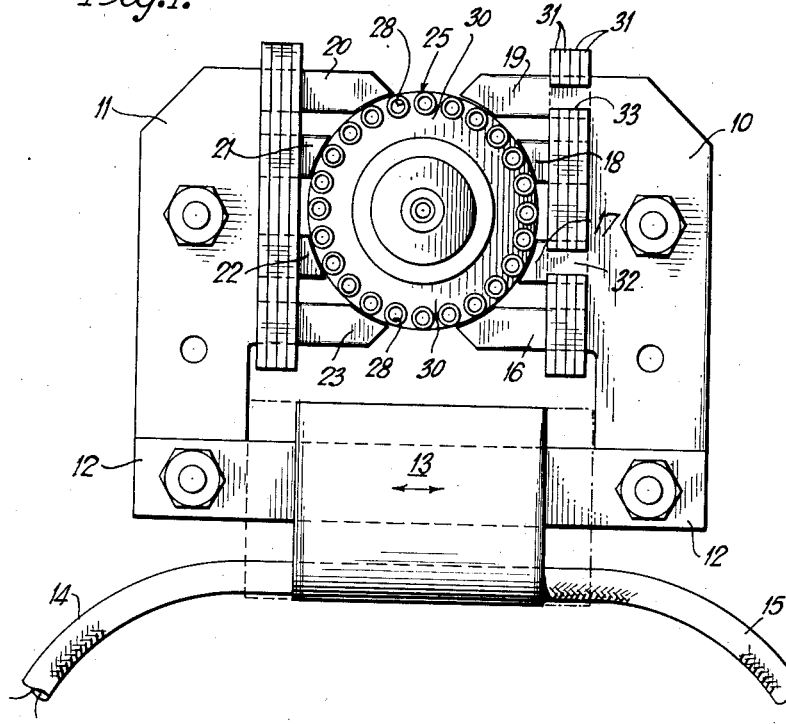
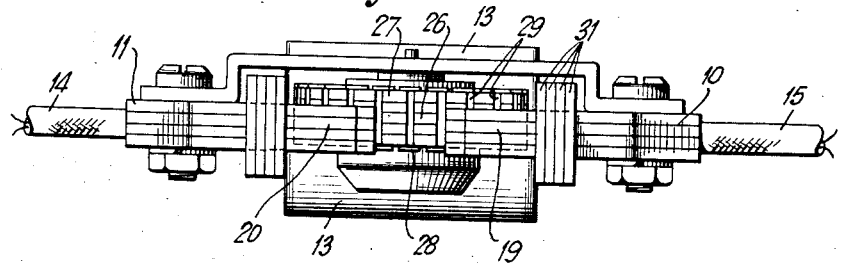
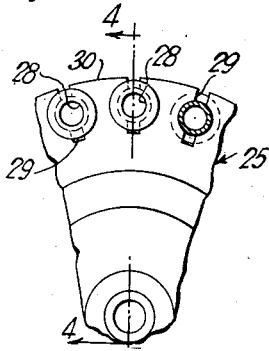
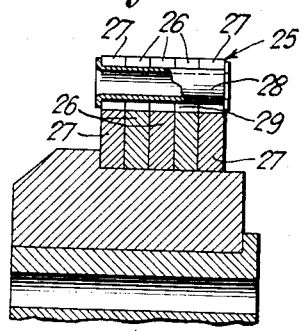

Patented Sept. 21, 1937

2,093,532

UNITED STATES PATENT OFFICE 2,093,532

SMALL SELF-STARTING SYNCHRONOUS MOTOR

Richard H. Whitehead, New Haven, Conn.

Application April 6, 1936, Serial No. 72,906

4 Claims. (Cl. 172—275)

This invention relates to small self starting synchronous motors designed for operating timing devices such as clocks and time switches.

It is an object of this invention to provide a new and improved motor of the character described which is of such simple construction and so rigid in its parts that it may be made by quantity production methods and notwithstanding can be relied upon to operate so that individual adjustments and rejections are reduced to a minimum.

It is a further object to provide a motor of the character described which will operate at a very slow synchronous speed so that lubrication problems and reduction gearing problems are reduced to a minimum.

It is a further object to provide a motor of this character which will come into synchronism reliably from rest when the current is thrown on and which will maintain its synchronism with absolute fidelity over a wide range of voltage fluctuations.

It is a further object to design the mechanical structure of the motor so that when the essential parts are assembled they will serve to brace each other to offer a maximum rigidity with a minimum of parts.

It is a further object to provide a motor which will offer all the necessary adjustment in a simple manner and which will prove sufficient to bring the operating characteristics of every motor produced by quantity production methods within commercial requirements.

When small synchronous small speed motors have been produced for clocks, the principle has been adopted of dividing the pole faces into sections so that the rotor may be designed to move one pole face section for alternation instead of moving from one pole face to the next during that alternation. This results in very greatly reducing the synchronous speed, but at the same time it has complicated manufacturing problems because it has increased the accuracy with which the pole faces must be held relative to each other and relative to the rotor sections.

It is a further object of this invention to provide a motor in which the tolerances of variation may be relatively great without interfering with the operating characteristics.

Other objects of the invention will in part be obvious and will in part appear hereinafter.

The invention accordingly comprises the features of construction, combination of elements, and arrangements of parts, which will be exemplified in the construction hereinafter set forth and the scope of the application of which will be indicated in the claims.

For a fuller understanding of the nature and objects of the invention, reference should be had to the following detailed description, taken in connection with the accompanying drawing, in which:

Figure 1 is a plan view of a device embodying this invention.

Figure 2 is a top elevation thereof.

Figure 3 is an enlarged fragment of the rotor periphery showing a modification.

Figure 4 is a section of the line 4—4 of Figure 3.

In the drawing the numerals 10 and 11 designate a pair of pole members joined together at the base by a yoke 12 surrounded by an energizing coil 13 fed by leads 14 and 15. Each of the pole pieces 10 and 11 has a plurality of inwardly projecting arms 16, 17, 18, and 19, for the pole face 10, and 20, 21, 22, and 23 for the pole face 11. These arms each being joined to this end pole face at its base and extending outwardly toward the rotor, being cut to conform to the periphery of the rotor, thus forming four spaced pole sections for each pole. The rotor 25 is of a squirrel cage variety comprising a plurality of laminae 26 of magnetic material with outer discs 27 of copper, held together by tubular rivets 28 passing through all of the discs 26 and 27 in the usual manner to form a squirrel cage armature.

If desired the discs 26 may be slotted as shown at 29 Figure 3 in order more sharply to segregate the rotor sections 30 lying between the rivets. The alternate pole sections, for example 16 and 18, and 20 and 22, are in registry with the sections 30 of the rotor simultaneously being spaced apart angularly a distance equal to an integral number of rotor sections. The other sections 17 and 19 and 21 and 23 are also in position to be in registry with the sections 30 simultaneously, but only when the pole sections 16 and 18 are out of registry.

A plurality of copper shading coils 31 are arranged to embrace the arms 16, 17, 18 and 19, and arms 20, 21, 22, and 23, thereby holding the different laminae of the field together and at the same time bracing the arms from spreading away from or toward each other so as to alter the proper relative displacement between them. These coils, however, are cut through as at 32 and 33, opposite two alternate poles 17 and 19, and 21 and 23, so that the shading coil while giving mechanical support to all of the poles can act as a shading coil only to the uncut poles 16 and 18, and 20 and 22.

With the construction above described it will be clear that when the coil 13 is energized the pole faces 17 and 19 and 21 and 23 will be energized in phase with the current, but that the flux through the arms 16 and 18 and 20 and 22 will be delayed by the eddy currents flowing in the shading coil thereby producing a phase displacement for creating a distorted revolving field.

With this construction it will be clear that when the coil is energized the flux flowing in the arms 19 and 17, 21 and 23 will be followed in sequence by the flux in the arms 18 and 16, 20 and 22, and this effective movement of the flux generates current in the hollow bars 28 tending to start the rotor as an induction motor. As soon, however, as the rotor attains a speed whereby one rotor section passes beneath each pole section for each alternation, the locking effect is sufficient to hold the motor rotating at that speed which becomes the synchronous speed of the motor. In the constructions shown, there are 24 rotor sections so that the speed of the rotor becomes 7200 divided by 24 or 300 revolutions per minute.

With the construction as shown, it will be noted that the sections 17 and 18 are relatively short and hence particularly when braced by the shading coils substantially free from any liability of being bent out of place. The arms 16 and 19, on the other hand, extend almost to the edge of the rotor to a position where even if bent laterally out of place it would not materially affect the effective angular phase displacement on these pole sections. By reason of the fact that the arms comprising the pole sections are parallel to each other it is possible to utilize the shading coils when the latter are stamped accurately to a forced fit as an efficient, simple and rigid means of holding the laminae and the pole faces in their proper positions.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patents, is:

1. A motor having an induction synchronous armature with segregated poles, a field structure having two poles energized by a single coil, parallel slots in each of said poles to divide it into four separate pole sections, a plurality of shading coils each adapted to encircle two alternate pole sections and having means for embracing each adjacent pole section to hold it in place without encircling the same.

2. A motor having an induction synchronous armature with segregated poles, a field structure having two poles energized by a single coil, said coil being movable along said field structure, parallel slots in each of said poles to divide it into four separate pole sections, a plurality of shading coils each adapted to encircle two alternate pole sections and having means for embracing each adjacent pole section to hold it in place without encircling the same.

3. A motor of the character described having a squirrel cage armature with segregated pole sections, a field structure having two poles energized by a single coil, each pole being divided into four or more sections, and lying in a common plane, adjacent pole sections being spaced in the direction of the periphery of the armature by a non-integral number of armature poles and the alternating pole sections being spaced an integral number of armature poles and shading coils on each alternate section.

4. A motor of the character described having a squirrel cage armature with segregated pole sections, a field structure having two poles energized by a single coil, each pole being divided into four or more parallel sections and lying in a common plane, adjacent pole sections being spaced in the direction of the periphery of the armature by a non-integral number of armature poles and the alternating pole sections being spaced an integral number of armature poles and a shading coil adapted to slide over all of said sections and a slit opposite each alternate section to prevent phase displacement in said section.

RICHARD H. WHITEHEAD.